UNITED STATES PATENT OFFICE

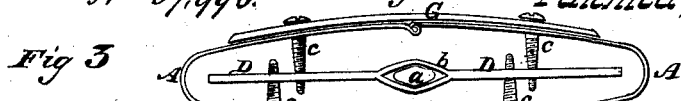

J. TAYLOR AND R. M. LAFFERTY, OF THREE RIVERS, MICHIGAN.

IMPROVEMENT IN BROOM-HEADS.

Specification forming part of Letters Patent No. 57,998, dated September 11, 1866.

*To all whom it may concern:*

Be it known that we, JEREMY TAYLOR and ROBERT M. LAFFERTY, of Three Rivers, St. Joseph county, State of Michigan, have invented a new and Improved Broom-Head; and we do hereby declare that the following is a full, clear, and exact description thereof, reference being had to the accompanying drawings, making a part of this specification, in which—

Figure 1 is an external view of the improved broom-head. Fig. 2 is a section taken longitudinally through the head. Fig. 3 is a transverse section through the head. Figs. 4 and 5 are end views of the head.

Similar letters of reference indicate corresponding parts in the several figures.

This invention relates to a new and improved mode of constructing brooms, whereby any persons can make their own brooms and repair them when worn out.

This invention consists in an elliptical tapering block or socket, through which the handle passes, and to which is permanently attached a metallic sheath, suitably formed to receive and inclose the filling or whisks of corn which form the broom, and is provided with laterally-clamping springs and adjusting-screws, together with a centrally-arranged bar for the purpose of holding the lower end of the handle, and through which the adjusting-screws pass, and for the purpose of more firmly holding the filling or whisks of corn within said sheath, as will be hereinafter described.

To enable others skilled in the art to understand our invention, we will describe its construction and operation.

In the accompanying drawings, B represents an elliptical tapering block or socket, through the center of which the broom-handle C passes. Socket B is made of wood or other suitable material, to which is attached a metallic sheath, A, which is made of thin sheet metal, so that it will possess the required flexibility and strength. This sheath may be formed of one or more parts suitably secured together, and in the form shown in the drawings, and firmly secured to said head or socket.

The handle C is constructed with one end tapering, as shown at $a$, Figs. 2 and 3, which end is inserted through the head-block B, and also through an elongated eye, $b$, that is made through a bar, D, as shown in the above-mentioned figures, and also in Figs. 4 and 5. In this way the handle is securely fastened to its head, and forms a support for the cross-bar D, for keeping this bar in the center of the sheath A.

The cross-bar D is located near the flaring opening of the sheath, and may be nearly equal in length to the longest part of the sheath. It is tapped for receiving four screws, $c$ $c$, which pass transversely and loosely through holes which are made through the sheath, and also through spring-clamps G G placed on the outside of said sheath. The holes which are made through the spring-clamps and sheath should be slightly elongated, so that the screws will not bind on said parts, but work loosely through them.

The clamps G G are narrow strips of metal of a suitable length, placed on the outside of the sheath near the flaring end, and opposite each other, and held in place by the adjusting-screws $c$, which are located near the extremities of these clamps, as shown in the drawings.

Fig. 5 shows the sheath A expanded ready to receive the filling, which is evenly arranged on each side of the center bar, D, and confined in its place by setting up the screws against the clamps G G, which are made of less yielding material than the sheath, said clamps, by the action of the screws, pressing the sheath evenly and firmly upon the filling. The sheath A is made of light yielding material, and is pressed, in opposite directions, directly in line with the center bar, D, and thus caused to hold the filling in a most substantial manner.

Fig. 4 shows the screws set up against the clamps and the clamps pressing against the sheath.

Having thus described our invention, what we claim as new, and desire to secure by Letters Patent, is—

1. The combination of the clamping-springs G G and adjusting-screws $c$ $c$ with the center bar, D, attached to the sheath A, so that the ends of the screws are within the sheath, substantially as described.

2. A center bar, D, arranged with a central socket for holding the tapering end of the broom-handle, substantially as described.

3. The combination of the block B, handle C, passing through it, flexible sheath A, and center bar D, in which the handle rests, as described.

JEREMY TAYLOR.
ROBERT M. LAFFERTY.

Witnesses:
 OSCAR F. BEARD,
 S. BEARD.